(12) United States Patent
Kelley, Jr. et al.

(10) Patent No.: US 7,326,867 B2
(45) Date of Patent: *Feb. 5, 2008

(54) OMNIDIRECTIONAL TILT AND VIBRATION SENSOR

(75) Inventors: Whitmore B. Kelley, Jr., Enfield, NH (US); Brian Blades, Concord, NH (US)

(73) Assignee: SignalQuest, Inc., Lebanon, NH (US)

( * ) Notice: Subject to any disclaimer, the term of this patent is extended or adjusted under 35 U.S.C. 154(b) by 90 days.

This patent is subject to a terminal disclaimer.

(21) Appl. No.: 11/336,309

(22) Filed: Jan. 20, 2006

(65) Prior Publication Data

US 2006/0157332 A1 Jul. 20, 2006

Related U.S. Application Data

(63) Continuation-in-part of application No. 11/037,497, filed on Jan. 18, 2005, now Pat. No. 7,067,748.

(51) Int. Cl.
*H01H 35/02* (2006.01)
(52) U.S. Cl. ................. 200/61.45 R; 200/61.45 M
(58) Field of Classification Search .......... 200/61.45 R–61.45 M, 61.48–61.53
See application file for complete search history.

(56) References Cited

U.S. PATENT DOCUMENTS

| | | | | |
|---|---|---|---|---|
| 4,099,040 A | * | 7/1978 | Bitko ............. | 200/220 |
| 4,816,662 A | * | 3/1989 | Kyoden ........... | 200/5 R |
| 5,006,676 A | * | 4/1991 | Bogut et al. ..... | 200/61.52 |
| 5,030,955 A | * | 7/1991 | Durst et al. ..... | 341/176 |
| 5,136,126 A | * | 8/1992 | Blair ............. | 200/61.52 |
| 5,136,127 A | * | 8/1992 | Blair ............. | 200/61.52 |
| 5,332,876 A | * | 7/1994 | Romano et al. .. | 200/61.52 |
| 5,533,520 A | * | 7/1996 | Inguaggiato ..... | 600/595 |
| 5,672,856 A | * | 9/1997 | Kolb et al. ...... | 200/61.52 |
| 6,198,059 B1 | * | 3/2001 | Jou .............. | 200/61.52 |
| 6,198,396 B1 | | 3/2001 | Frank | |
| 6,313,417 B1 | * | 11/2001 | Schnell .......... | 200/61.47 |
| 6,348,665 B1 | | 2/2002 | Ohashi et al. | |
| 2006/0157331 A1 | | 7/2006 | Kelley et al. | |
| 2007/0169360 A1 | | 7/2007 | Kelley et al. | |

* cited by examiner

*Primary Examiner*—Elvin Enad
*Assistant Examiner*—Lisa Klaus
(74) *Attorney, Agent, or Firm*—Peter A. Nieves; Sheehan, Phinney, Bass + Green, P.A.

(57) ABSTRACT

An omni-directional tilt and vibration sensor contains a first electrically conductive element, a second electrically conductive element, and an electrically insulative element. The electrically insulative element is connected to the first electrically conductive element and the second electrically conductive element, where at least a portion of the first electrically conductive element and at least a portion of the second electrically conductive element are located within the electrically insulative element. A plurality of electrically conductive weights are located within a cavity of the sensor, wherein the cavity is defined by at least one surface of the first electrically conductive element, at least one surface of the electrically insulative element, and at least one surface of the second electrically conductive element.

25 Claims, 14 Drawing Sheets

CLOSED

CLOSED

OMNIDIRECTIONAL TILT AND VIBRATION SENSOR

CROSS-REFERENCE TO RELATED APPLICATIONS

The present application is a continuation-in-part of U.S. patent application Ser. No. 11/037,497, filed Jan. 18, 2005, now U.S. Pat. No. 7,067,748 and having the title "OMNIDIRECTIONAL TILT AND VIBRATION SENSOR," the entire disclosure of which is incorporated wherein by reference.

FIELD OF THE INVENTION

The present invention is generally related to sensors, and more particularly is related to an omnidirectional tilt and vibration sensor.

BACKGROUND OF THE INVENTION

Many different electrical tilt and vibration switches are presently available and known to those having ordinary skill in the art. Typically, tilt switches are used to switch electrical circuits ON and OFF depending on an angle of inclination of the tilt switch. These types of tilt switches typically contain a free moving conductive element located within the switch, where the conductive element contacts two terminals when the conductive element is moved into a specific position, thereby completing a conductive path. An example of this type of tilt switch is a mercury switch. Unfortunately, it has been proven that use of Mercury may lead to environmental concerns, thereby leading to regulation on Mercury use and increased cost of Mercury containing products, including switches.

To replace Mercury switches, newer switches use a conductive element capable of moving freely within a confined area. A popularly used conductive element is a single metallic ball. Tilt switches having a single metallic ball are capable of turning ON and OFF in accordance with a tilt angle of the tilt switch. Certain tilt switches also contain a ridge, a bump, or a recess, that prevents movement of the single metallic ball from a closed position (ON) to an open position (OFF) unless the tilt angle of the tilt switch is in excess of a predetermined angle.

An example of a tilt switch requiring exceeding of a tilt angle of the tilt switch is provided by US. Pat. No. 5,136,157, issued to Blair on Aug. 4, 1992 (hereafter, the '157 patent). The '157 patent discloses a tilt switch having a metallic ball and two conductive end pieces separated by a non-conductive element. The two conductive end pieces each have two support edges. A first support edge of the first conductive end piece and a first support edge of the second conductive end piece support the metallic ball there-between, thereby maintaining electrical communication between the first conductive end piece and the second conductive end piece. Maintaining electrical communication between the first conductive end piece and the second conductive end piece keeps the tilt switch in a closed position (ON). To change the tilt switch into an open position (OFF), the metallic ball is required to be moved so that the metallic ball is not connected to both the first conductive end piece and the second conductive end piece. Therefore, changing the tilt switch into an open position (OFF) requires tilting of the '157 patent tilt switch past a predefined tilt angle, thereby removing the metallic ball from location between the first and second conductive end piece. Unfortunately, tilt switches generally are not useful in detecting minimal motion, regardless of the tilt angle.

Referring to vibration switches, typically a vibration switch will have a multitude of components that are used to maintain at least one conductive element in a position providing electrical communication between a first conductive end piece and a second conductive end piece. An example of a vibration switch having a multitude of components is provided by U.S. Pat. No. 6,706,979 issued to Chou on Mar. 16, 2004 (hereafter, the '979 patent). In one embodiment of Chou, the '979 patent discloses a vibration switch having a conductive housing containing an upper wall, a lower wall, and a first electric contact body. The upper wall and the lower wall of the conductive housing define an accommodation chamber. The conductive housing contains an electrical terminal connected to the first electric contact body for allowing electricity to traverse the housing. A second electric contact body, which is separate from the conductive housing, is situated between the upper wall and lower wall of the conductive housing (i.e., within the accommodation chamber). The second electric contact body is maintained in position within the accommodation chamber by an insulating plug having a through hole for allowing an electrical terminal to fit therein.

Both the first electrical contact body and the second electrical contact body are concave in shape to allow a first and a second conductive ball to move thereon. Specifically, the conductive balls are adjacently located within the accommodation chamber with the first and second electric contact bodies. Due to gravity, the '979 patent first embodiment vibration switch is typically in a closed position (ON), where electrical communication is maintained from the first electrical contact body, to the first and second conductive balls, to the second electrical contact body, and finally to the electrical terminal.

In an alternative embodiment, the '979 patent discloses a vibration switch that differs from the vibration switch of the above embodiment by having the first electrical contact body separate from the conductive housing, yet still entirely located between the upper and lower walls of the housing, and an additional insulating plug, through hole and electrical terminal. Unfortunately, the many portions of the '979 patent vibration switch results in more time required for assembly, in addition to higher cost.

Thus, a heretofore unaddressed need exists in the industry to address the aforementioned deficiencies and inadequacies.

SUMMARY OF THE INVENTION

Embodiments of the present invention provide an omnidirectional tilt and vibration sensor and a method of construction thereof. Briefly described, in architecture, one embodiment of the system, among others, can be implemented as follows. The sensor contains a first electrically conductive element, a second electrically conductive element, and an electrically insulative element. The electrically insulative element is connected to the first electrically conductive element and the second electrically conductive element, where at least a portion of the first electrically conductive element and at least a portion of the second electrically conductive element are located within the electrically insulative element. A plurality of electrically conductive weights are located within a cavity of the sensor, wherein the cavity is defined by at least one surface of the first electrically conductive element, at least one surface of the electrically insulative element, and at least one surface of the second electrically conductive element.

The present invention can also be viewed as providing methods for assembling the omnidirectional tilt and vibration sensor having a first electrically conductive element, a second electrically conductive element, an electrically insulative element, and a plurality of electrically conductive weights. In this regard, one embodiment of such a method, among others, can be broadly summarized by the following steps: fitting a distal portion of the first electrically conductive element within a hollow center of the electrically insulative member, wherein a proximate portion of the first electrically conductive element remains external to the hollow center of the electrically insulative member; positioning the plurality of electrically conductive weights within the hollow center of the electrically insulative member; and fitting a distal portion of the second electrically conductive element within the hollow center of the electrically insulative member, wherein a proximate portion of the second electrically conductive element remains external to the hollow center of the electrically insulative member.

Other systems, methods, features, and advantages of the present invention will be or will become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1:
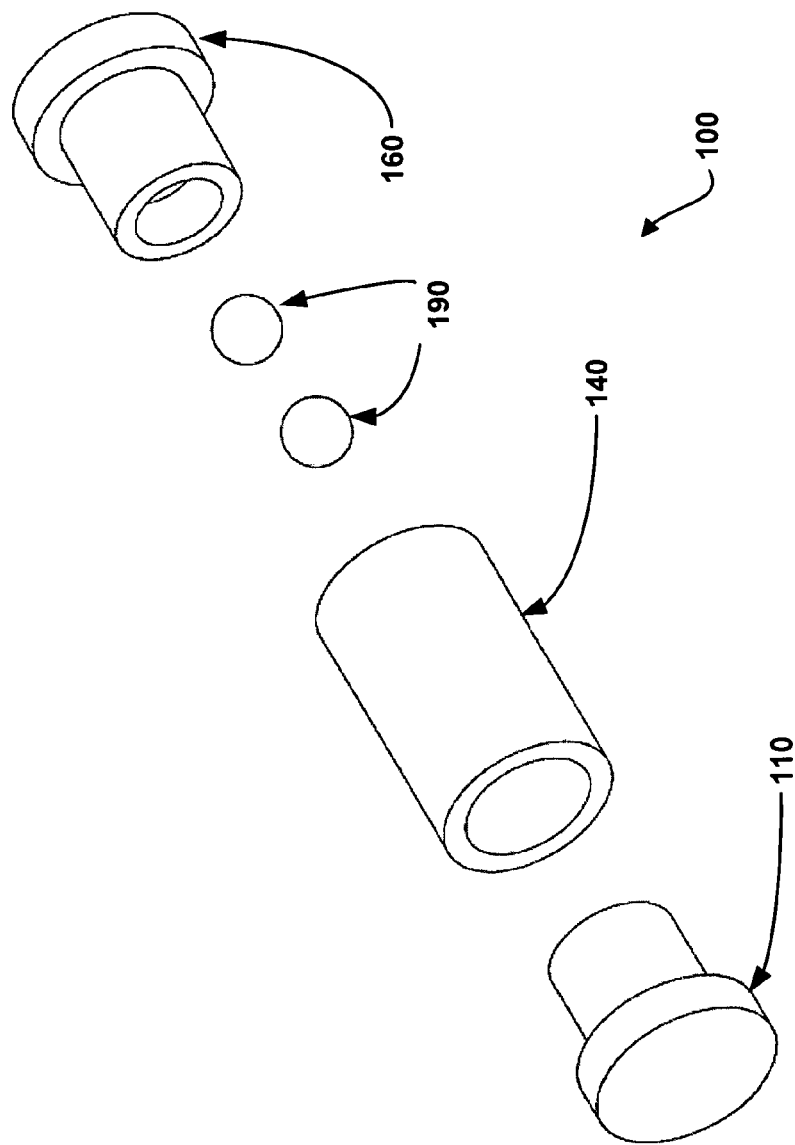
FIG. 1 is an exploded perspective side view of the present omnidirectional tilt and vibration sensor, in accordance with a first exemplary embodiment of the invention.

The following describes an omnidirectional tilt and vibration sensor. The sensor contains a minimal number of cooperating parts to ensure ease of assembly and use. FIG. 1 is an exploded perspective side view of the present omnidirectional tilt and vibration sensor 100 (hereafter, "the sensor 100"), in accordance with a first exemplary embodiment of the invention.

Referring to FIG. 1, the sensor 100 contains a first end cap 110, a central member 140, a second end cap 160, and multiple weights embodied as a pair of conductive balls 190 that are spherical in shape (hereafter, conductive spheres). The first end cap 110 is conductive, having a proximate portion 112 and a distal portion 122. Specifically, the first end cap 110 may be constructed from a composite of high conductivity and/or low reactivity metals, a conductive plastic, or any other conductive material.

Figure 2:
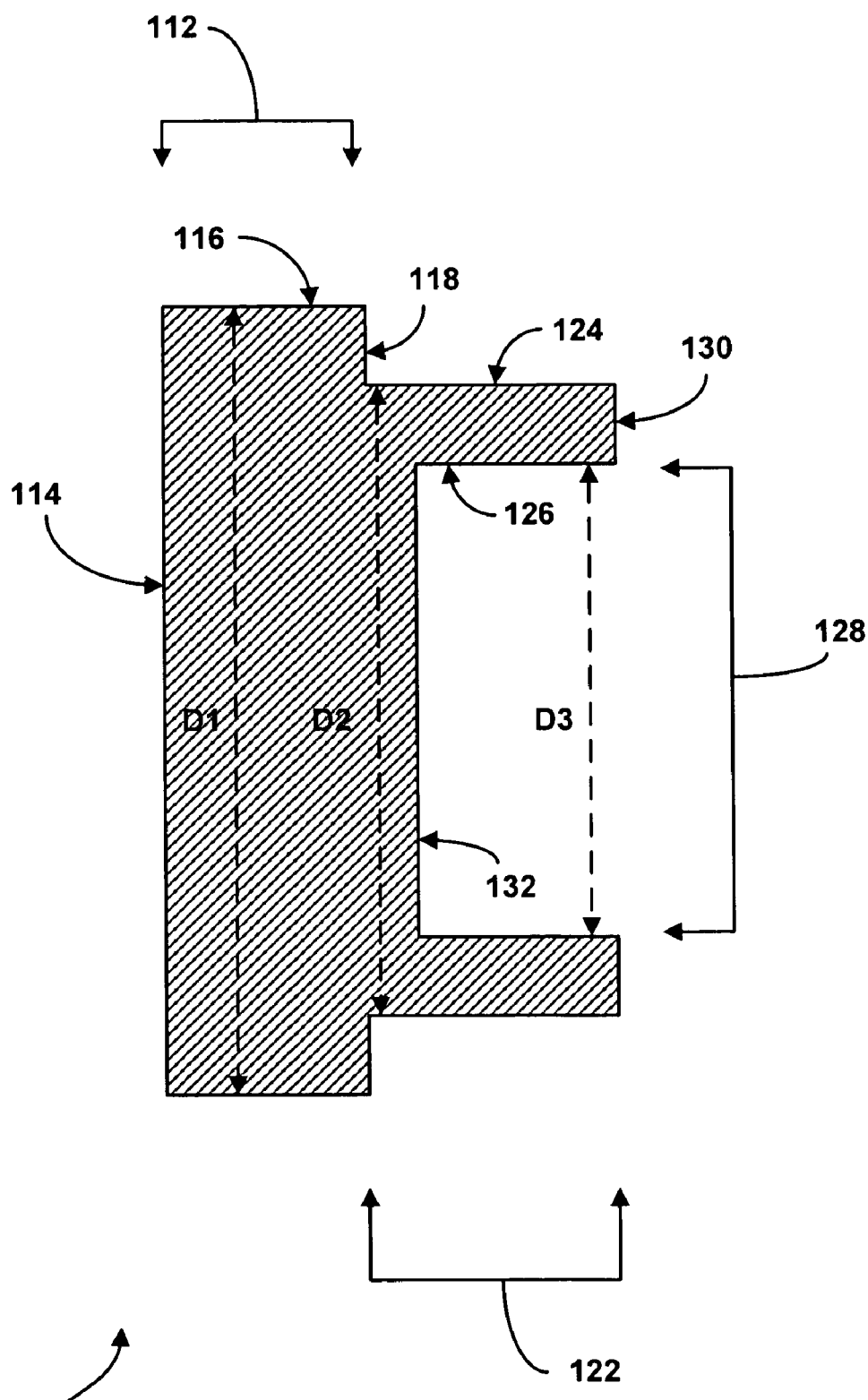
FIG. 2 is a cross-sectional side view of the first end cap of FIG. 1.

FIG. 2 is a cross-sectional side view of the first end cap 110 which may be referred to for a better understanding of the location of portions of the first end cap 110. The proximate portion 112 of the first end cap 110 is circular, having a diameter D1, and having a flat end surface 114. A top surface 116 of the proximate portion 112 runs perpendicular to the flat end surface 114. A width of the top surface 116 is the same width as a width of the entire proximate portion 112 of the first end cap 110. The proximate portion 112 also contains an internal surface 118 located on a side of the proximate portion 112 that is opposite to the flat end surface 114, where the top surface 116 runs perpendicular to the internal surface 118. Therefore, the proximate portion 112 is in the shape of a disk. The disk shape of the first end cap 110 is also referred to herein as a flange of the first end cap 110.

It should be noted that while FIG. 2 illustrates the proximate portion 112 of the first end cap 110 having a flat end surface 114 and the proximate portion 162 (FIG. 4) of the second end cap 160 having a flat surface 164 (FIG. 4), one having ordinary skill in the art would appreciate that the proximate portions 112, 162 (FIG. 4) do not require presence of a flat end surface. Instead, the flat end surfaces 114, 164 may be convex or concave. In addition, instead of being circular, the first end cap 110 and the second end cap 160 may be square-like in shape, or they may be any other shape. Use of circular end caps 110, 160 is merely provided for exemplary purposes. The main function of the end caps 110, 160 is to provide a connection to allow an electrical charge introduced to the first end cap 110 to traverse the conductive spheres 190 and be received by the second end cap 160, therefore, many different shapes and sizes of end caps 110, 160 may be used as long as the conductive path is maintained.

The relationship between the top portion 116, the flat end surface 114, and the internal surface 118 described herein is provided for exemplary purposes. Alternatively, the flat end surface 114 and the internal surface 118 may have rounded or otherwise contoured ends resulting in the top surface 116 of the proximate portion 112 being a natural rounded progression of the end surface 114 and the internal surface 118.

The distal portion 122 of the first end cap 110 is tube-like in shape, having a diameter D2 that is smaller than the diameter D1 of the proximate portion 112. The distal portion 122 of the first end cap 110 contains a top surface 124 and a bottom surface 126. The bottom surface 126 of the distal portion 122 defines an exterior portion of a cylindrical gap 128 located central to the distal portion 122 of the first end cap 110. A diameter D3 of the cylindrical gap 128 is smaller than the diameter D2 of the distal portion 122.

Progression from the proximate portion 112 of the first end cap 110 to the distal portion 122 of the first end cap 110 is defined by a step where a top portion of the step is defined by the top surface 116 of the proximate portion 112, a middle portion of the step is defined by the internal surface 118 of the proximate portion 112, and a bottom portion of the step is defined by the top surface 124 of the distal portion 122.

The distal portion 122 of the first end cap 110 also contains an outer surface 130 that joins the top surface 124 and the bottom surface 126. It should be noted that while FIG. 2 shows the cross-section of the outer surface 130 as being squared to the top surface 124 and the bottom surface 126, the outer surface 130 may instead be rounded or of a different shape.

As is better shown by FIG. 2, the distal portion 122 of the first end cap 110 is an extension of the proximate portion 112 of the first end cap 110. In addition, the top surface 124, the outer surface 130, and the bottom surface 126 of the distal portion 122 form a cylindrical lip of the first end cap 110. As is also shown by FIG. 2, the distal portion 122 of the first end cap 110 also contains an inner surface 132, the diameter of which is equal to or smaller than the diameter D3 of the cylindrical gap 128. While FIG. 2 illustrates the inner surface 132 as running parallel to the flat end surface 114, as is noted hereafter, the inner surface 132 may instead be concave, conical, or hemispherical.

Figure 3:
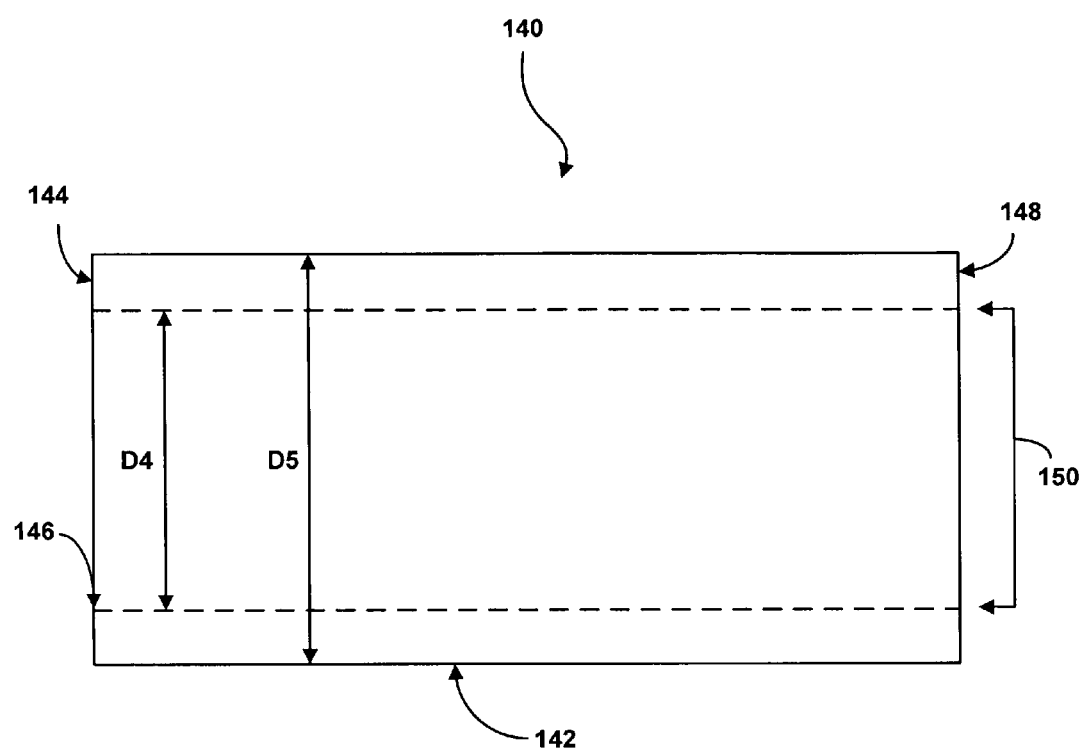
FIG. 3 is a cross-sectional side view of the central member of FIG. 1.

Referring to FIG. 1, the central member 140 of the sensor 100 is tube-like in shape, having a top surface 142, a proximate surface 144, a bottom surface 146, and a distal surface 148. FIG. 3 is a cross-sectional side view of the central member 140 and may also be referred to for a better understanding of the location of portions of the central member 140. It should be noted that the central member 140 need not be tube-like in shape. Alternatively, the central member 140 may have a different shape, such as, but not limited to that of a square.

The bottom surface 146 of the central member 140 defines a hollow center 150 having a diameter D4 that is just slightly larger than the diameter D2 (FIG. 2), thereby allowing the distal portion 122 of the first end cap 110 to fit within the hollow center 150 of the central member 140 (FIG. 3). In addition, the top surface 142 of the central member 140 defines the outer surface of the central member 140 where the central member 140 has a diameter D5. It should be noted that the diameter D1 (i.e., the diameter of the proximate portion 112 of the first end cap 110) is preferably slightly larger than diameter D5 (i.e., the diameter of the central member 140). Of course, different dimensions of the central member 140 and end caps 110, 160 may also be provided. In addition, when the sensor 100 is assembled, the proximate surface 144 of the central member 140 rests against the internal surface 118 of the first end cap 110.

Unlike the first end cap 110 and the second end cap 160, the central member 140 is not electrically conductive. As an example, the central member 140 may be made of plastic, glass, or any other nonconductive material. In an alternative embodiment of the invention, the central member 140 may also be constructed of a material having a high melting point that is above that used by commonly used soldering materials. As is further explained in detail below, having the central member 140 non-conductive ensures that the electrical conductivity provided by the sensor 100 is provided through use of the conductive spheres 190. Specifically, location of the central member 140 between the first end cap 110 and the second end cap 160 provides a non-conductive gap between the first end cap 110 and the second end cap 160.

Referring to FIG. 1, the second end cap 160 is conductive, having a proximate portion 162 and a distal portion 172. Specifically, the second end cap 160 may be constructed from a composite of high conductivity and/or low reactivity metals, a conductive plastic, or any other conductive material.

Figure 4:
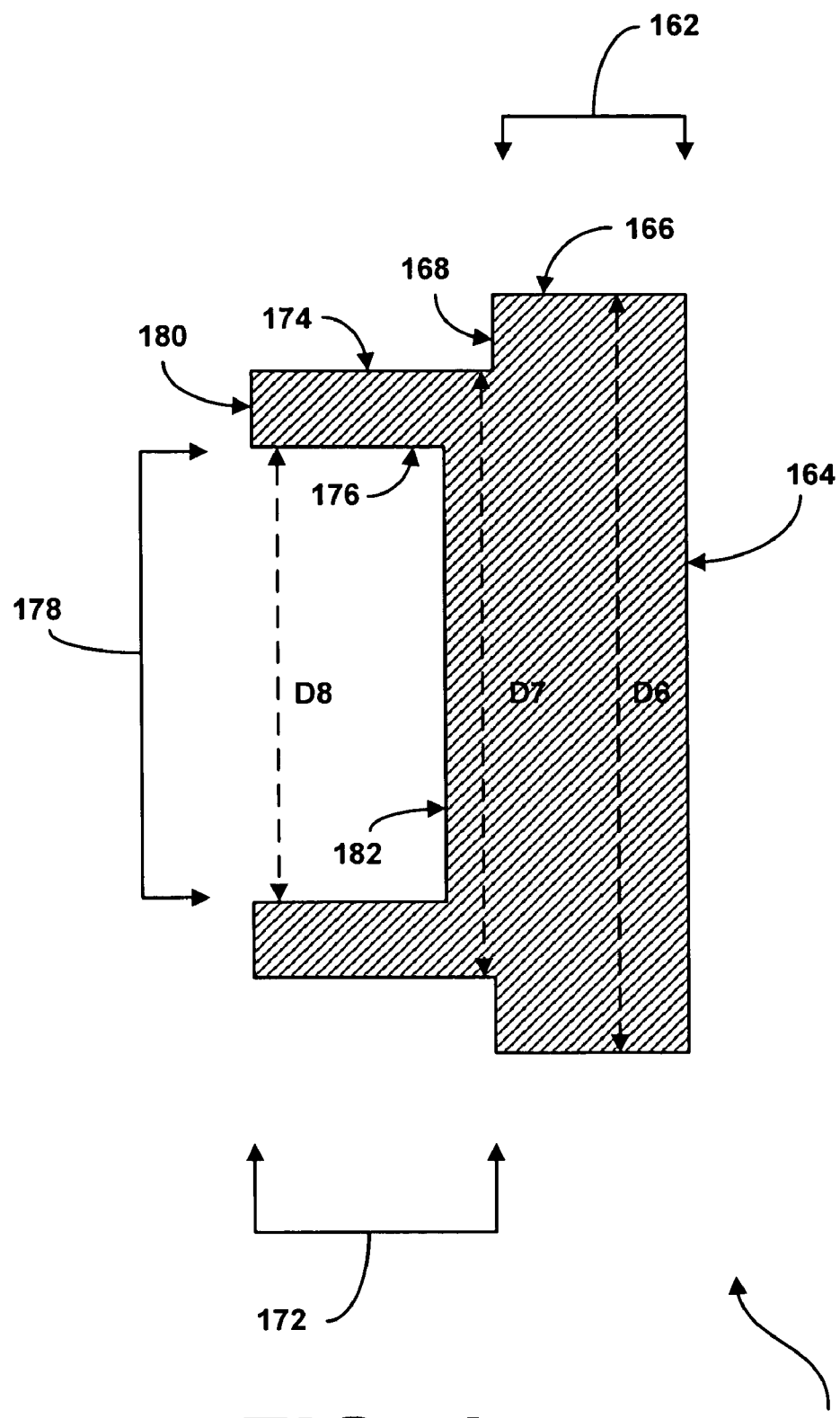
FIG. 4 is a cross-sectional side view of the second end cap of FIG. 1.

FIG. 4 is a cross-sectional side view of the second end cap 160 which may be referred to for a better understanding of the location of portions of the second end cap 160. The proximate portion 162 of the second end cap 160 is circular, having a diameter D6, and having a flat end surface 164. A top surface 166 of the proximate portion 162 runs perpendicular to the flat end surface 164. A width of the top surface 166 is the same width as a width of the entire proximate portion 162 of the second end cap 160. The proximate portion 162 also contains an internal surface 168 located on a side of the proximate portion 162 that is opposite to the flat end surface 164, where the top surface 166 runs perpendicular to the internal surface 168. Therefore, the proximate portion 162 is in the shape of a disk. The disk shape of the second end cap 160 is also referred to herein as a flange of the second end cap 160.

The relationship between the top portion 166, the flat end surface 164, and the internal surface 168 described herein is provided for exemplary purposes. Alternatively, the flat end surface 164 and the internal surface 168 may have rounded or otherwise contoured ends resulting in the top surface 166 of the proximate portion 162 being a natural rounded progression of the end surface 164 and the internal surface 168.

The distal portion 172 of the second end cap 160 is tube-like is shape, having a diameter D7 that is smaller than the diameter D6 of the proximate portion 162. The distal portion 172 of the second end cap 160 contains a top surface 174 and a bottom surface 176. The bottom surface 176 of the distal portion 172 defines an exterior portion of a cylindrical gap 178 located central to the distal portion 172 of the second end cap 160. A diameter D8 of the cylindrical gap 178 is smaller than the diameter D7 of the distal portion 172.

Progression from the proximate portion 162 of the second end cap 160 to the distal portion 172 of the second end cap 160 is defined by a step where a top portion of the step is defined by the top surface 166 of the proximate portion 162, a middle portion of the step is defined by the internal surface 168 of the proximate portion 162, and a bottom portion of the step is defined by the top surface 174 of the distal portion 172.

The distal portion 172 of the second end cap 160 also contains an outer surface 180 that joins the top surface 174 and the bottom surface 176. It should be noted that while FIG. 4 shows the cross-section of the outer surface 180 as being squared to the top surface 174 and the bottom surface 176, the outer surface 180 may instead be rounded or of a different shape.

As is better shown by FIG. 4, the distal portion 172 of the second end cap 160 is an extension of the proximate portion 162 of the second end cap 160. In addition, the top surface 174, the outer surface 180, and the bottom surface 176 of the distal portion 172 form a cylindrical lip of the second end cap 160. As is also shown by FIG. 4, the distal portion 172 of the second end cap 160 also contains an inner surface 182, the diameter of which is equal to or smaller than the diameter D8 of the cylindrical gap 178. While FIG. 4 illustrates the inner surface 182 as running parallel to the flat end surface 164, the inner surface 182 may instead be concave, conical, or hemispherical.

It should be noted that dimensions of the second end cap 160 are preferably the same as dimensions of the first end cap 110. Therefore, the diameter D4 of the central member 140 hollow center 150 is also just slightly larger that the diameter D7 of the second end cap 160, thereby allowing the distal portion 172 of the second end cap 160 to fit within the hollow center 150 of the central member 140. In addition, the diameter D6 (i.e., the diameter of the proximate portion 162 of the second end cap 160) is preferably slightly larger that diameter D5 (i.e., the diameter of the central member 140). Further, when the sensor 100 is assembled, the distal surface 148 of the central member 140 rests against the internal surface 168 of the second end cap 160.

Referring to FIG. 1, the pair of conductive spheres 190, including a first conductive sphere 192 and a second conductive sphere 194, fit within the central member 140, within a portion of the cylindrical gap 128 of the first distal portion 122 of the first end cap 110, and within a portion of the cylindrical gap 178 of the second end cap 160. Specifically, the inner surface 132, bottom surface 126, and outer surface 130 of the first end cap 110, the bottom surface 146 of the central member 140, and the inner surface 182, bottom surface 176, and outer surface 180 of the second end cap 160 form a central cavity 200 of the sensor 100 where the pair of conductive spheres 190 are confined.

Further illustration of location of the conductive spheres 190 is provided and illustrated with regard to FIGS. 6A, 6B, and 7A-7D. It should be noted that, while the figures in the present disclosure illustrate both of the conductive spheres 190 as being substantially symmetrical, alternatively, one sphere may be larger that the other sphere. Specifically, as long as the conductive relationships described herein are maintained, the conductive relationships may be maintained by both spheres being larger, one sphere being larger than the other, both spheres being smaller, or one sphere being smaller. It should be noted that the conductive spheres 190 may instead be in the shape of ovals, cylinders, or any other shape that permits motion within the central cavity in a manner similar to that described herein.

Figure 5:
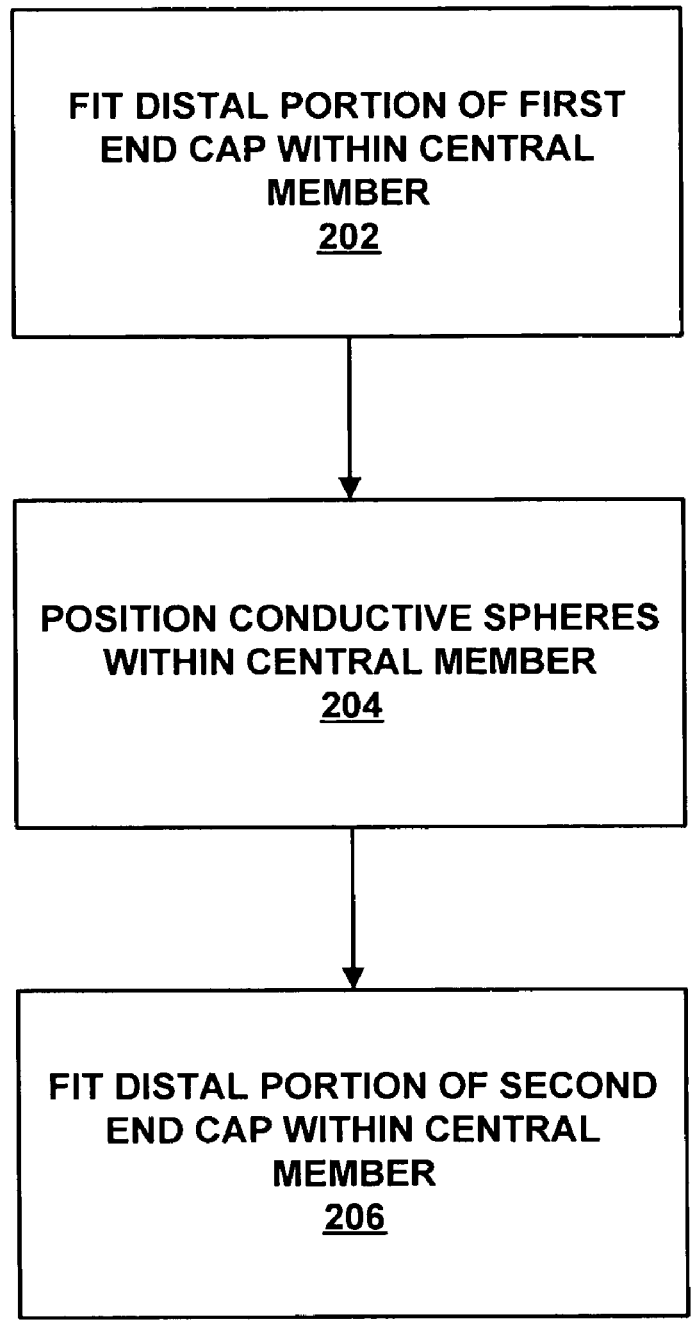
FIG. 5 is a flowchart illustrating a method of assembling the omnidirectional tilt and vibration sensor of FIG. 1.

Due to minimal components, assembly of the sensor 100 is quite simplistic. Specifically, there are four components, namely, the first end cap 10, the central member 140, the conductive spheres 190, and the second end cap 160. FIG. 5 is a flowchart illustrating a method of assembling the omnidirectional tilt and vibration sensor 100 of FIG. 1. It should be noted that any process descriptions or blocks in flowcharts should be understood as representing modules, segments, portions of code, or steps that include one or more instructions for implementing specific logical functions in the process, and alternate implementations are included within the scope of the present invention in which functions may be executed out of order from that shown or discussed, including substantially concurrently or in reverse order, depending on the functionality involved, as would be understood by those reasonably skilled in the art of the present invention.

As is shown by block 202, the distal portion 122 of the first end cap 110 is fitted within the hollow center 150 of the central member 140 so that the proximate surface 144 of the central member 140 is adjacent to or touching the internal surface 118 of the first end cap 110. The conductive spheres 190 are then positioned within the hollow center 150 of the central member 140 and within a portion of the cylindrical gap 128 (block 204). The distal portion 172 of the second end cap 160 is then fitted within the hollow center 150 of the central member 140, so that the distal surface 148 of the central member 140 is adjacent to or touching the internal surface 168 of the second end cap 160 (block 206).

In accordance with an alternative embodiment of the invention, the sensor 100 may be assembled in an inert gas, thereby creating an inert environment within the central cavity 200, thereby reducing the likelihood that the conductive spheres 190 will oxidize. As is known by those having ordinary skill in the art, oxidizing of the conductive spheres 190 would lead to a decrease in the conductive properties of the conductive spheres 190. In addition, in accordance with another alternative embodiment of the invention, the first end cap 110, the central member 140, and the second end cap 160 may be joined by a hermetic seal, thereby preventing any contaminant from entering the central cavity 200.

Figure 6A:
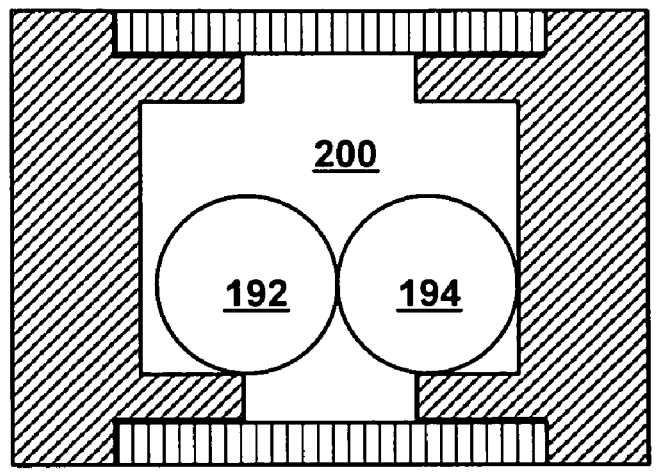
FIG. 6A and FIG. 6B are cross-sectional side views of the sensor of FIG. 1 in a closed state, in accordance with the first exemplary embodiment of the invention.
Figure 6B:
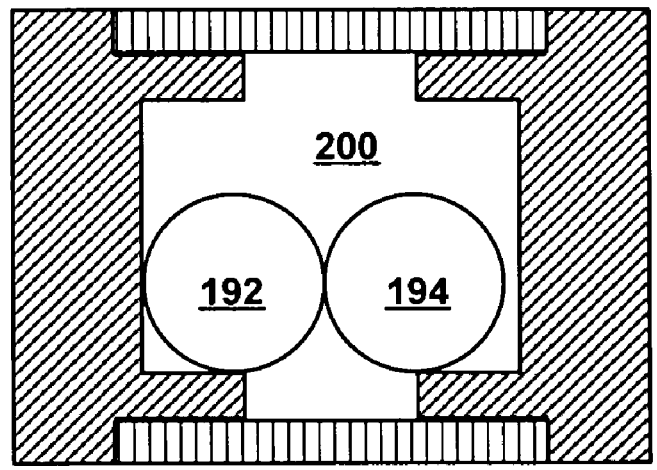
Figure 7A:
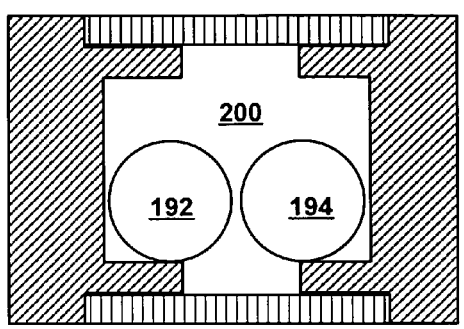
FIGS. 7A, 7B, 7C, and 7D are cross-sectional side views of the sensor of FIG. 1 in an open state, in accordance with the first exemplary embodiment of the invention.
Figure 7B:
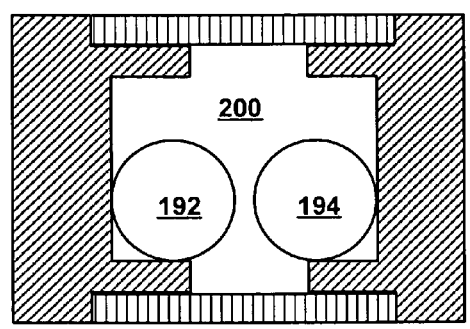
Figure 7C:
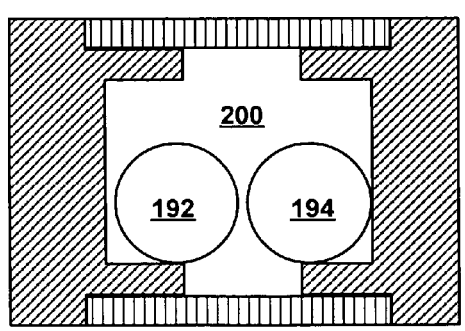
Figure 7D:
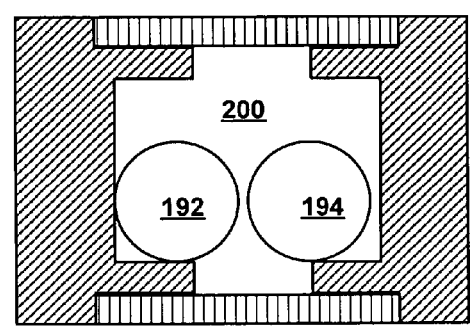

The sensor 100 has the capability of being in a closed state or an open state, depending on location of the conductive spheres 190 within the central cavity 200 of the sensor 100. FIG. 6A and FIG. 6B are cross-sectional views of the sensor 100 of FIG. 1 in a closed state, in accordance with the first exemplary embodiment of the invention. In order for the sensor 100 to be maintained in a closed state, an electrical charge introduced to the first end cap 110 is required to traverse the conductive spheres 190 and be received by the second end cap 160.

Referring to FIG. 6A, the sensor 100 is in a closed state because the first conductive sphere 192 is touching the bottom surface 126 of the first end cap 110, the conductive spheres 192, 194 are touching, and the second conductive sphere 194 is touching the bottom surface 176 and inner surface 182 of the second end cap 162, thereby providing a conductive path from the first end cap 110, through the conductive spheres 190, to the second end cap 160. Referring to FIG. 6B, the sensor 100 is in a closed state because the first conductive sphere 192 is touching the bottom surface 126 and inner surface 132 of the first end cap 110, the conductive spheres 192, 194 are touching, and the second conductive sphere 194 is touching the bottom surface 176 of the second end cap 162, thereby providing a conductive path from the first end cap 110, through the conductive spheres 190, to the second end cap 160. Of course, other arrangements of the first and second conductive spheres 190 within the central cavity 200 of the sensor 100 may be provided as long as the conductive path from the first end cap 110 to the conductive spheres 190, to the second end cap 160 is maintained.

FIGS. 7A-FIG. 7D are cross-sectional views of the sensor 100 of FIG. 1 in an open state, in accordance with the first exemplary embodiment of the invention. In order for the sensor 100 to be maintained in an open OFF state, an electrical charge introduced to the first end cap 110 cannot traverse the conductive spheres 190 and be received by the second end cap 160. Referring to FIGS. 7A-7D, each of the sensors 100 displayed are in an open state because the first conductive sphere 192 is not in contact with the second conductive sphere 194. Of course, other arrangements of the first and second conductive spheres 190 within the central cavity 200 of the sensor 100 may be provided as long as no conductive path is provided from the first end cap 110 to the conductive spheres 190, to the second end cap 160.

Figure 8:
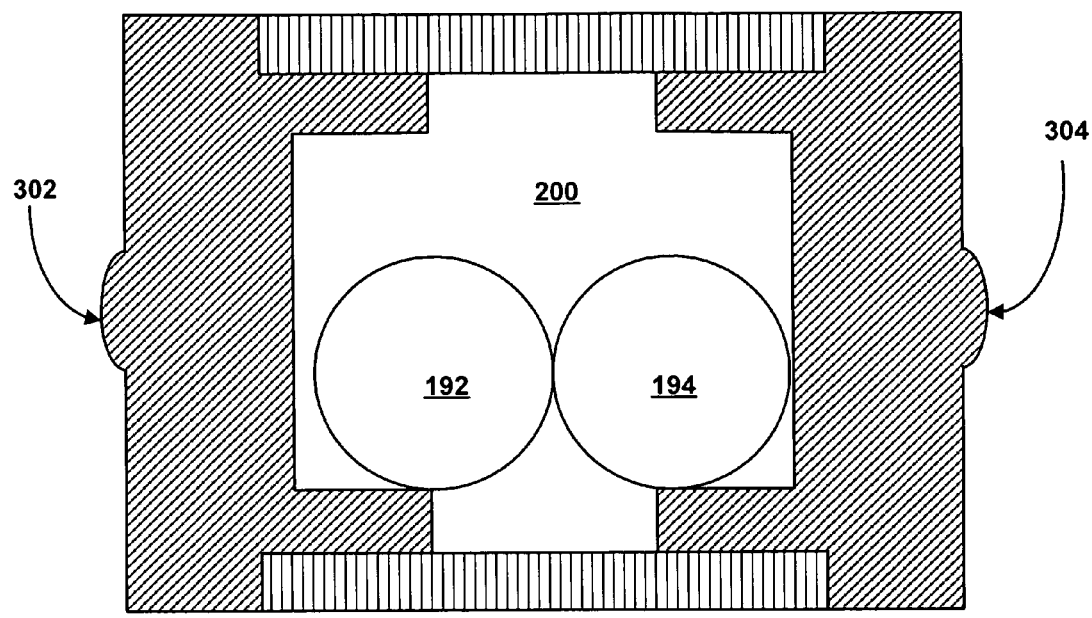
FIG. 8 is a cross-sectional side view of the present omnidirectional tilt and vibration sensor, in accordance with a second exemplary embodiment of the invention.

FIG. 8 is a cross-sectional side view of the present omnidirectional tilt and vibration sensor 300, in accordance with a second exemplary embodiment of the invention. The sensor 300 of the second exemplary embodiment of the invention contains a first nub 302 located on the flat end surface 114 of the first end cap 110 and a second nub 304 located on a flat end surface 164 of the second end cap 160. The nubs 302, 304 provide a conductive mechanism for allowing the sensor 300 to connect to a printed circuit board (PCB) landing pad, where the PCB landing pad has an opening cut into it allowing the sensor to recess into the opening. Specifically, dimensions of the sensor in accordance with the first exemplary embodiment and the second exemplary embodiment of the invention may be selected so as to allow the sensor to fit within a landing pad of a PCB. Within the landing pad there may be a first terminal and a second terminal. By using the nubs 302, 304, fitting the sensor 300 into landing pad may press the first nub 302 against the first terminal and the second nub 304 against the second terminal. Those having ordinary skill in the art would understand the basic structure of a PCB landing pad, therefore, further explanation of the landing pad is not provided herein.

It should be noted that the sensor of the first and second embodiments have the same basic rectangular shape, thereby contributing to ease of preparing a PCB for receiving the sensor 100, 300. Specifically, a hole may be cut in a PCB the size of the sensor 100 (i.e., the size of the first and second end caps 110, 160 and the central member 140) so that the sensor 100 can drop into the hole, where the sensor is prevented from falling through the hole when caught by the nubs 302, 304 that land on connection pads. In the first exemplary embodiment of the invention, where there are no nubs, the end caps 10, 160 may be directly mounted to the PCB.

In accordance with another alternative embodiment of the invention, the two conductive spheres may be replaced by more than two conductive spheres, or other shapes that are easily inclined to roll when the sensor 100 is moved.

Figure 9:
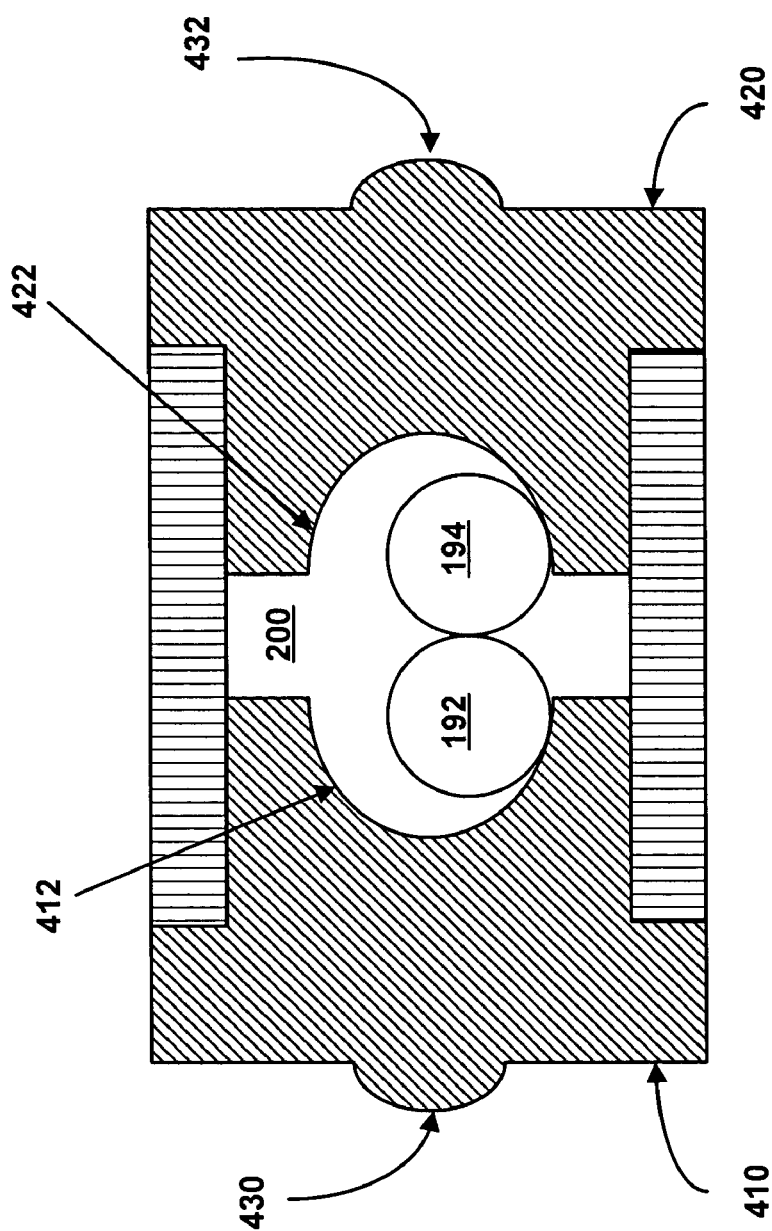
FIG. 9 is cross-sectional view of a sensor in a closed state, in accordance with a third exemplary embodiment of the invention.

FIG. 9 is cross-sectional view of a sensor 400 in a closed state, in accordance with a third exemplary embodiment of the invention. As is shown by FIG. 9, an inner surface 412 of a first end cap 410 is concave is shape. In addition, an inner surface 422 of a second end cap 420 is concave in shape. The sensor 400 of FIG. 9 also contains a first nub 430 and a second nub 432 that function in a manner similar to the nubs 302, 304 in the second exemplary embodiment of the invention. Having a sensor 400 with concave inner surfaces 412, 422 keeps the sensor 400 in a normally closed state due to the shape of the inner surfaces 412, 422 in combination with gravity causing the conductive spheres 192, 194 to be drawn together.

Figure 10:
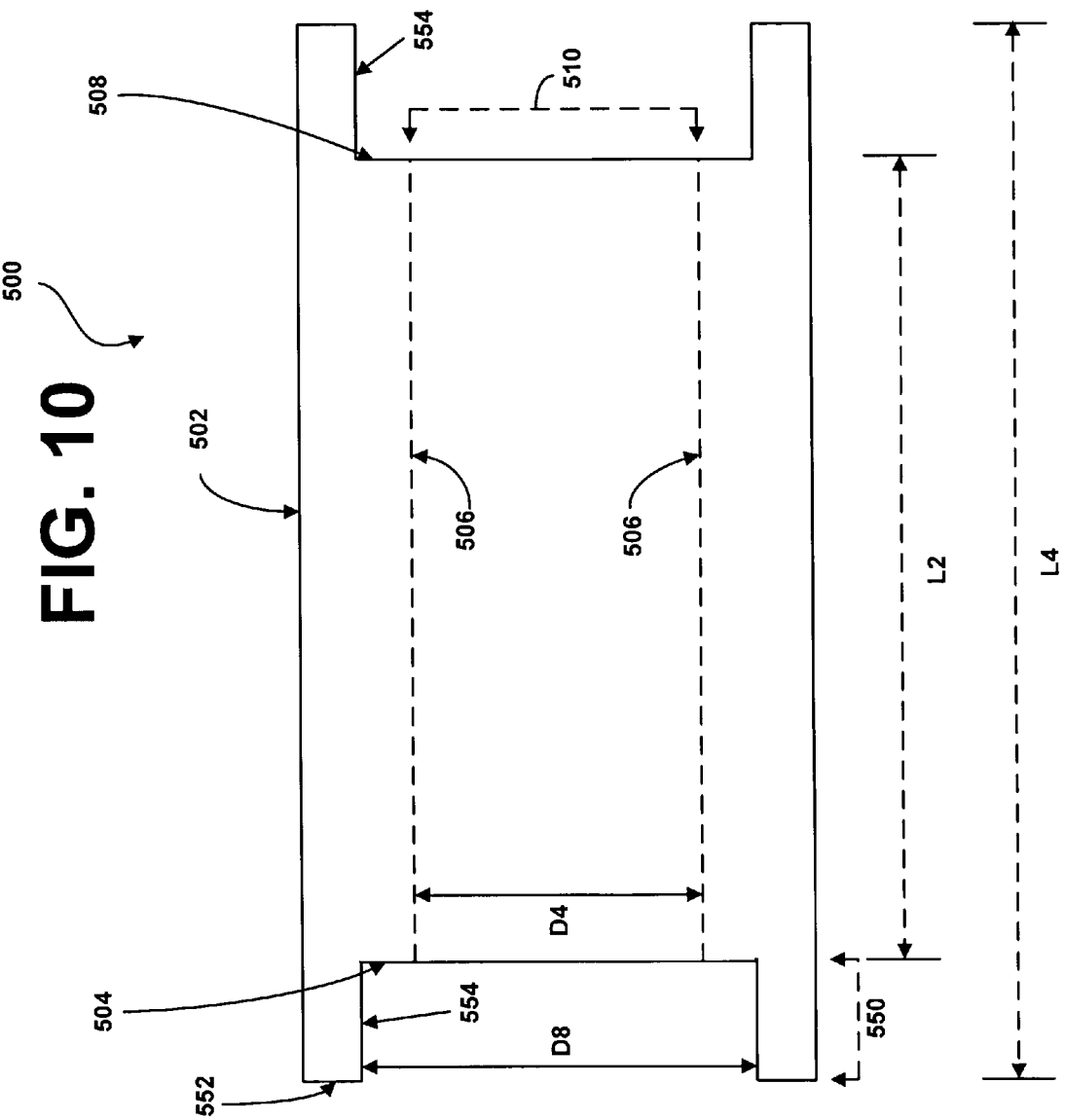
FIG. 10 is a cross-sectional side view of a central member of a sensor, in accordance with a fourth exemplary embodiment of the invention.

FIG. 10 is a cross-sectional side view of a central member of a sensor, in accordance with a fourth exemplary embodiment of the invention. Referring to FIG. 10, the central member 500 is tube-like in shape, having a top surface 502, a proximate surface 504, a bottom surface 506, and a distal surface 508. It should be noted that the central member 500 need not be tube-like in shape. Alternatively, the central member 500 may have a different shape, such as, but not limited to, that of a rectangle.

The bottom surface 506 of the central member 500 defines a hollow center having a diameter D4 that is slightly larger than the diameter D2 (FIG. 2) thereby allowing the distal portion 122 of the first end cap 110 to fit within the hollow center 510 of the central member 500. In addition, the central member 500 contains an outer lip 550. A top portion of the outer lip 550 is the top surface 502. The outer lip 550 also contains an outer lip end surface 552 and an outer lip bottom surface 554, where the outer lip bottom surface 554 is perpendicular to the outer lip end surface 552. Of course, the outer lip bottom surface 554 is not required to be perpendicular to the outer lip end surface 552.

The top surface 502 of the central member 500 has a length L4, while a length L2 of the hollow center 510 extends from the proximate surface 504 of the central member 500 to the distal surface 508 of the central member 500. The outer lip end surface 552 extends a distance ½ (L4-L2) from either the proximate surface 504 or from the distal surface 508 of the central member 500. The distance ½ (L4-L2) is the same or larger than the width of the top surface 116 (FIG. 2) of the proximate portion 112 (FIG. 2) of the first end cap 110 (FIG. 2), thereby having the first end cap 110 (FIG. 2) and the second end cap 160 (FIG. 4) within the central member 500.

The bottom surface 506 of the central member 500 defines the hollow center 510 having the diameter D4 that is slightly larger than the diameter D2 (FIG. 2), thereby allowing the distal portion 122 of the first end cap 110 to fit within the hollow center 150 of the central member 500. In addition, the distance between the bottom lip surface 554 of the central member 500 defines a diameter D8. It should be noted that the diameter D1 (i.e., the diameter of the proximate portion 112 (FIG. 2) of the first end cap 110 (FIG. 2)) is preferably slightly smaller than diameter D8. In addition, a diameter D6 (i.e., a diameter of the proximate portion 162 (FIG. 4) of the second end cap 160 (FIG. 4)) is preferably slightly smaller than diameter D8. Of course, different dimensions of the central member 500 and end caps 110, 160 may also be provided. In addition, when the tilt sensor 100 is assembled, the proximate surface 504 of the central member 500 rests against the internal surface 118 of the first end cap 110, and the bottom lip surface 554 of the central member 500 rests against the top surface 116 of the proximate portion 112. Further, when the tilt sensor 100 is assembled, the distal surface 508 of the central member 500 rests against an internal surface 168 of the second end cap 160, and the bottom lip surface 554 of the central member 500 rests against the top surface 166 of the proximate portion 162.

Figure 11:
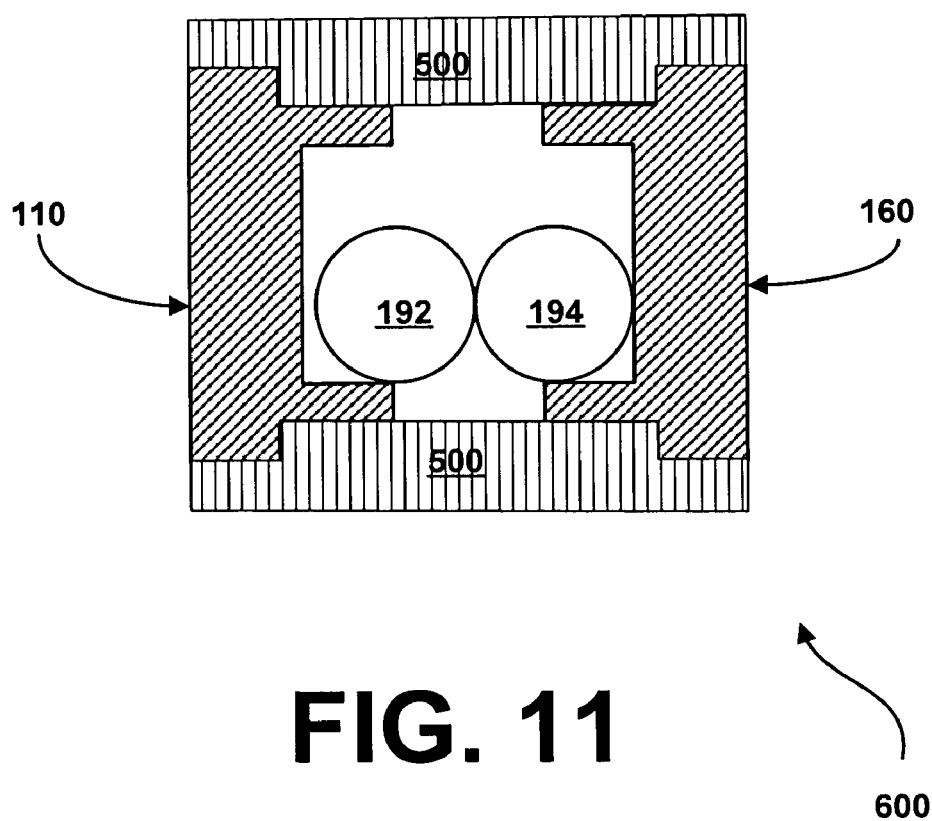
FIG. 11 is a cross-sectional side view of the sensor of which the central member of FIG. 10 is a part, in accordance with the fourth exemplary embodiment of the invention.

FIG. 11 is a cross-sectional side view of a sensor 600 of which the central member of FIG. 10 is a part, in accordance with the fourth exemplary embodiment of the invention. The sensor 600 is shown in a closed state.

Figure 12A:
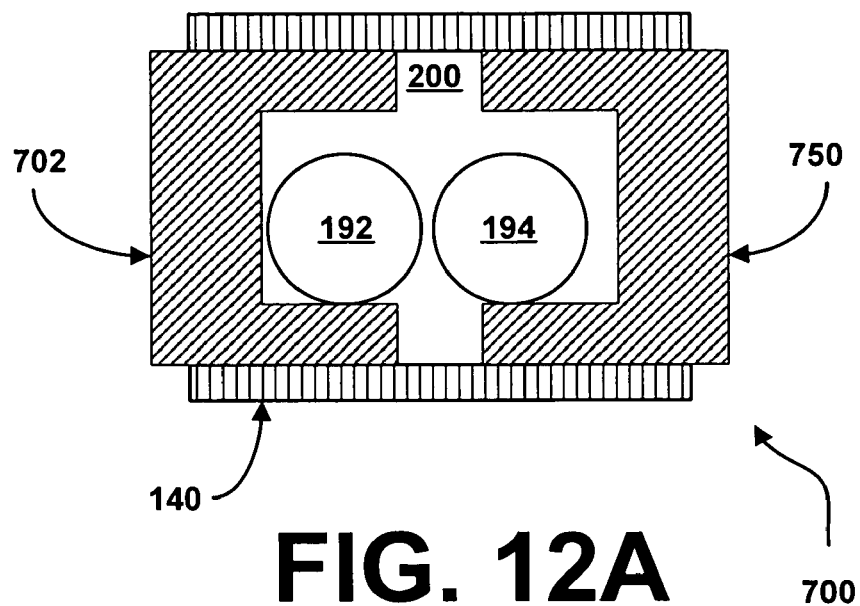
FIG. 12A is a cross-sectional side view of an omnidirectional tilt and vibration sensor, in accordance with a fifth exemplary embodiment of the invention, where the sensor is in an open state.

FIG. 12A is a cross-sectional side view of an omnidirectional tilt and vibration sensor 700, in accordance with a fifth exemplary embodiment of the invention, where the sensor 700 is in an open state. The sensor 700 of FIG. 12A does not contain a flange on a first end cap 702 or a flange on a second end cap 750. The central member 140 of the fifth exemplary embodiment of the invention is the same as the central member 140 of FIG. 3, and is therefore, not again described in detail.

Figure 12B:
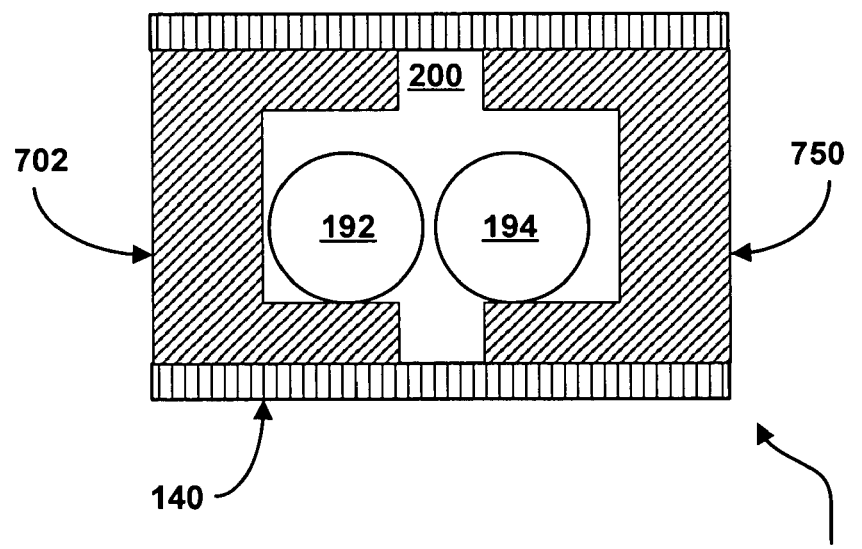
FIG. 12B is a cross-sectional side view of the omnidirectional tilt and vibration sensor of FIG. 12A, in accordance with an alternative embodiment of the invention.

FIG. 12B is a cross-sectional side view of the omnidirectional tilt and vibration sensor 700 of FIG. 12A, in accordance with an alternative embodiment of the invention, where the sensor 700 is in an open state. The sensor 700 does not contain a flange on the first end cap 702 or a flange on the second end cap 750. In addition, the central member 140 extends over the proximate portion 712 (FIG. 13) and a distal portion 722 (FIG. 13) of the first end cap 702, and over the proximate portion and the distal portion of the second end cap 750.

Figure 13:
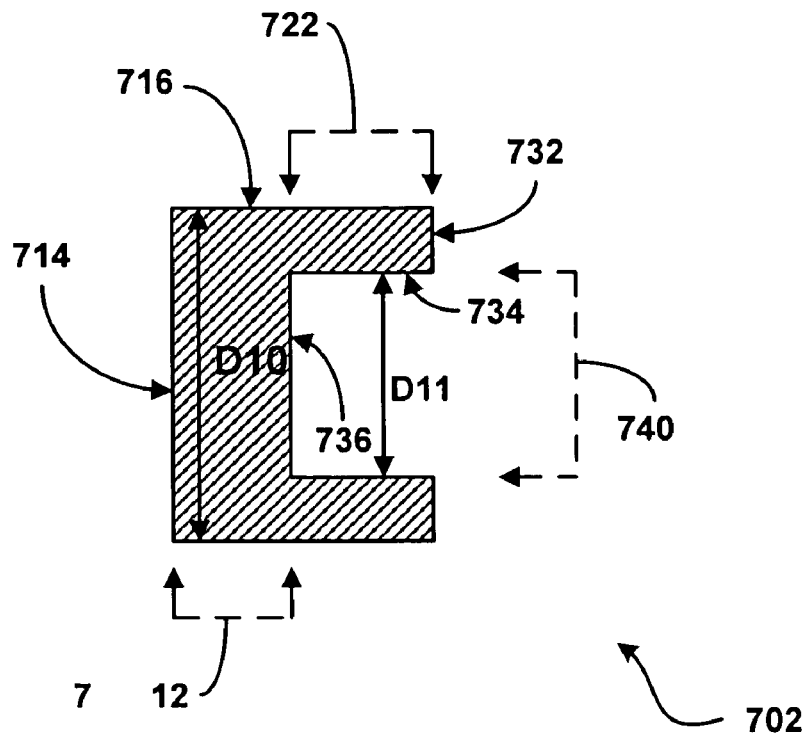
FIG. 13 is a cross-sectional side view of the first end cap of the sensor of FIG. 12A.

FIG. 13 is a cross-sectional side view of the first end cap 702, which may be referred to for a better understanding of the location of portions of the first end cap 702. A proximate portion 712 of the first end cap 702 is circular, having a diameter D10, and having a flat end surface 714. A top surface 716 of the first end cap 702 runs perpendicular to the flat end surface 714.

A distal portion 722 of the first end cap 702 is tube-like in shape, having the same diameter as the proximate portion 712. The distal portion 722 of the first end cap 702 contains an end surface 732, a plane of which is perpendicular to a plane of the top surface 716 of the first end cap 702. The distal portion 722 also contains a bottom surface 734 that runs parallel to the top surface 716 and an internal surface 736 that runs parallel to the flat end surface 714 of the proximate portion 712. The bottom surface 734 of the distal portion 722 defines an exterior portion of a cylindrical gap 740 located central to the distal portion 722 of the first end cap 702. A diameter D11 of the cylindrical gap 740 is smaller than the diameter D10 of the proximate portion 712.

The second end cap 750 (FIG. 12A) is similar in shape and size to the first end cap 702, and therefore, additional description of the second end cap 750 is not provided herein. Instead, reference can be made to the description of the first end cap 702, provided hereinabove, for an understanding of the second end cap 750.

It should be noted that while FIG. 13 illustrates the proximate portion 712 of the first end cap 702 having a flat end surface 714, and as mentioned above, the second end cap 750 is similar to the first end cap 702, one having ordinary skill in the art would appreciate that the proximate portions of the end caps 702, 750 do not require presence of a flat end surface. Instead, the flat end surface may be convex or concave. In addition, instead of being circular, the first end cap 702 and the second end cap 750 may be square-like in shape, or they may be a different shape. Use of circular end caps 702, 750 is merely provided for exemplary purposes. The main function of the end caps 702, 750 is to provide a conductive connection that allows an electrical charge introduced to the first end cap 702 to traverse the conductive spheres 190 and be received by the second end cap 750, therefore, many different shapes and sizes of end caps 702, 750 may be used as long as the conductive path is maintained.

Referring back to FIG. 12A, it should be noted that in accordance with the fifth embodiment of the invention, a portion of the first end cap 702 and a portion of the second end cap 750 is located outside of the central member 140, when the sensor 700 is assembled.

Figure 14:
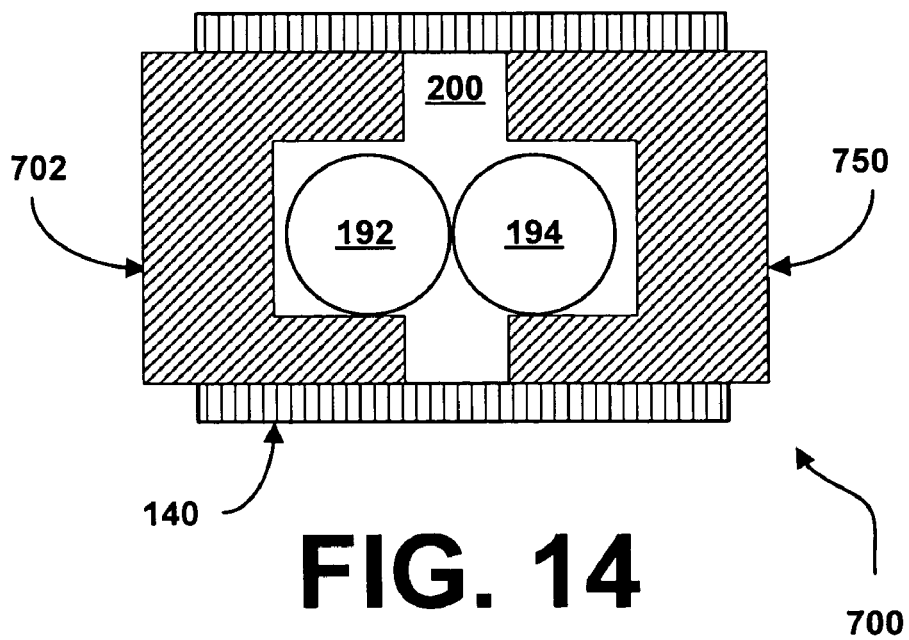
FIG. 14 is a cross-sectional view of the omnidirectional tilt and vibration sensor of FIG. 12A, where the sensor is in a closed state.

FIG. 14 is a cross-sectional side view of the omnidirectional tilt and vibration sensor 700 of FIG. 12A, where the sensor 700 is in a closed state.

Figure 15A:
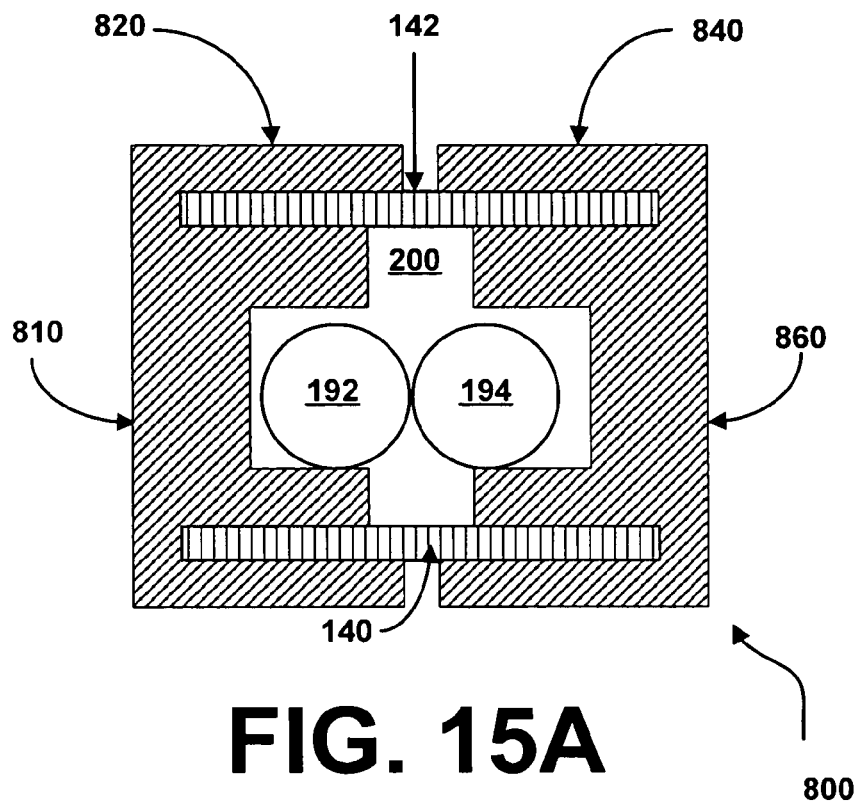
FIG. 15A and FIG. 15B are cross-sectional side views of the present omnidirectional tilt and vibration sensor, in accordance with a sixth exemplary embodiment of the invention.
Figure 15B:
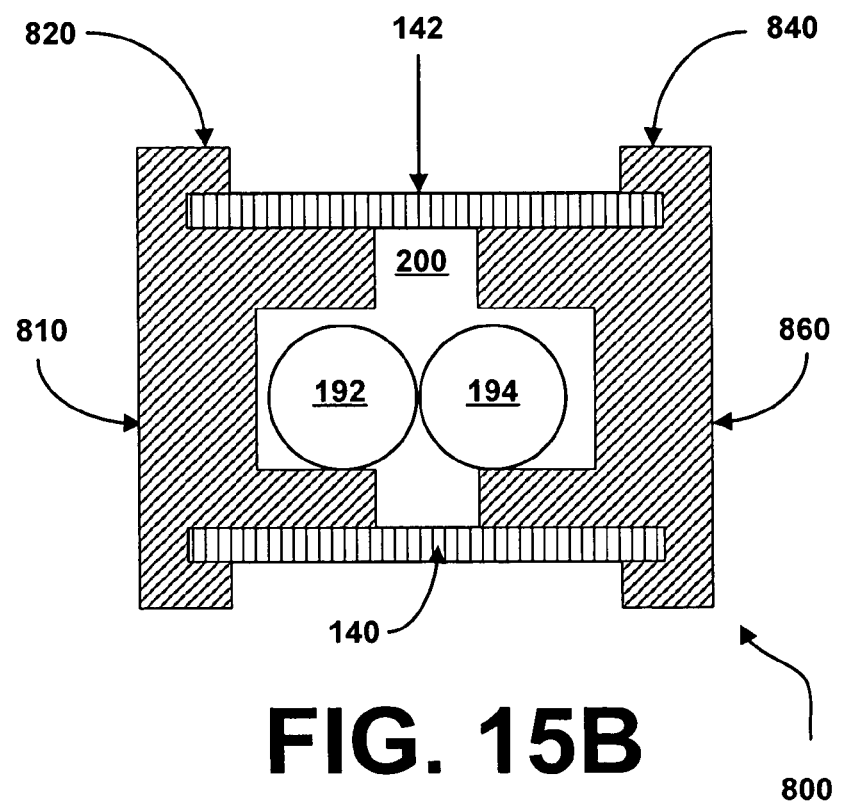

FIG. 15A and FIG. 15B are cross-sectional side views of a tilt sensor 800, in accordance with a sixth exemplary embodiment of the invention. As is show by FIGS. 15A and 15B, the first and second end caps 810, 860 have a top lip portion that overlaps a portion of the central member 140. The embodiment of the central member 140 illustrated by FIG. 15A and FIG. 15B is the central member 140 of FIG. 3.

The first end cap 810 contains a first top lip portion 820 that overlaps the top surface 142 of the central member 140. The first top lip portion 820 of the first end cap 810 is shown to overlap the top surface 142 of the central member 140 more in the embodiment of FIG. 15A than in the embodiment of FIG. 15B. The second end cap 860 contains a second top lip portion 840 that overlaps the top surface 142 of the central member 140. The first top lip portion 820 and the second top lip portion 840 form a cavity in which the central member 140 fits when assembling the tilt sensor 800.

It should be emphasized that the above-described embodiments of the present invention are merely possible examples of implementations, merely set forth for a clear understanding of the principles of the invention. Many variations and modifications may be made to the above-described embodiments of the invention with departing substantially from the spirit and principles of the invention. All such modifications and variations are intended to be included herein within the scope of this disclosure and the present invention and protected by the following claims.

What is claimed is:

1. A sensor, comprising:
    a first electrically conductive element;
    a second electrically conductive element;
    an electrically insulative element connected to the first electrically conductive element and the second electrically conductive element, where at least a portion of the first electrically conductive element and at least a portion of the second electrically conductive element are located within the electrically insulative element; and
    a plurality of electrically conductive weights located within a cavity of the sensor, wherein the cavity is defined by at least one surface of the first electrically conductive element, at least one surface of the electrically insulative element, and at least one surface of the second electrically conductive element.

2. The sensor of claim 1, wherein the sensor is in a closed state (ON) if a conductive path exists from the first electrically conductive element, through a first of the plurality of electrically conductive weights, through a second of the plurality of electrically conductive weights, to the second electrically conductive element, and wherein the sensor is in an open state (OFF) if there is no conductive path from the first electrically conductive element, through the first of the plurality of electrically conductive weights, through the second of the plurality of electrically conductive weights, to the second electrically conductive element.

3. The sensor of claim 1, wherein the first electrically conductive element is sealed to the electrically insulative element and the second electrically conductive element is sealed to the electrically insulative element.

4. The sensor of claim 1, wherein:
    the first electrically conductive element further comprises a first diameter on a proximate portion of the first electrically conductive element and a second diameter on a distal portion of the first electrically conductive element, where the second diameter is smaller than the first diameter;
    the second electrically conductive element further comprises a first diameter on a proximate portion of the second electrically conductive element and a second diameter on a distal portion of the second electrically conductive element, where the second diameter is smaller than the first diameter; and the electrically insulative element is further defined as having a proximate end and a distal end,
where at least the distal portion of the first electrically conductive element fits within a proximate end of the electrically insulative element, and where at least the distal portion of the second electrically conductive element fits within a distal end of the electrically insulative element.

5. The sensor of claim 4, wherein the first electrically conductive element further comprises a flat end surface located on a side opposite the distal portion of the first electrically conductive element, and wherein the second electrically conductive element further comprises a flat end surface located on a side opposite the distal portion of the second electrically conductive element.

6. The sensor of claim 5, wherein the flat end surface of the first electrically conductive element contains a first nub for providing electrical contact of the first electrically conductive element to a first terminal, and wherein the flat end surface of the second electrically conductive element contains a second nub for providing electrical contact of the second electrically conductive element to a second terminal.

7. The sensor of claim 4, wherein the distal portion of the first electrically conductive element further comprises:
a first top surface;
a first outer surface; and
a first bottom surface,
wherein the first top surface, the first outer surface, and the first bottom surface form a first cylindrical lip of the first electrically conductive element, and
wherein the distal portion of the second electrically conductive element further comprises:
a second top surface;
a second outer surface; and
a second bottom surface,
wherein the second top surface, the second outer surface, and the second bottom surface form a second cylindrical lip of the second electrically conductive element.

8. The sensor of claim 4, wherein a diameter of the distal portion of the first electrically conductive element and a diameter of the distal portion of the second electrically conductive element are smaller than a diameter of the electrically insulative element.

9. The sensor of claim 4, wherein a portion of the distal portion of the first electrically conductive element, an inner portion of the second electrically conductive element, and the distal portion of the second electrically conductive element define the cavity, where the cavity is filled with an inert gas.

10. The sensor of claim 4, wherein at least a portion of the proximate portion of the first electrically conductive element and at least a portion of the proximate portion of the second electrically conductive element are located external to the electrically insulative element.

11. The sensor of claim 4, further defined by:
the proximate portion of the first electrically conductive element further comprising a top surface and an end surface; and
the proximate portion of the second electrically conductive element further comprising a top surface and an end surface,
wherein the top surface of the first electrically conductive element and the top surface of the second electrically conductive element are located internal to the electrically insulative element.

12. The tilt sensor of claim 11, wherein the end surface of the first electrically conductive element and the end surface of the second electrically conductive element are located external to the electrically insulative element.

13. The sensor of claim 1, wherein the first electrically conductive element and the second electrically conductive element are equal in dimension.

14. The sensor of claim 1, wherein the electrically insulative element is fabricated from a material selected from the group consisting of plastic and glass.

15. The sensor of claim 1, wherein the electrically insulative element is tube-like in shape.

16. The sensor of claim 1, wherein the electrically insulative element is square-like in shape.

17. The sensor of claim 1, wherein:
the first electrically conductive element further comprises a first diameter on a proximate portion of the first electrically conductive element and a second diameter on a distal portion of the first electrically conductive element, where the second diameter is the same as the first diameter;
the second electrically conductive element further comprises a first diameter on a proximate portion of the second electrically conductive element and a second diameter on a distal portion of the second electrically conductive element, where the second diameter is the same as the first diameter; and
the electrically insulative element is further defined as having a proximate end and a distal end,
where at least the distal portion of the first electrically conductive element fits within a proximate end of the electrically insulative element, and where at least the distal portion of the second electrically conductive element fits within a distal end of the electrically insulative element.

18. The sensor of claim 17, wherein the distal portion of the first electrically conductive element further comprises:
a top surface of the first electrically conductive element;
a first outer surface; and
a first bottom surface,
wherein the top surface, the first outer surface, and the first bottom surface form a first cylindrical lip of the first electrically conductive element, and
wherein the distal portion of the second electrically conductive element further comprises:
a top surface of the second conductive element;
a second outer surface; and
a second bottom surface,
wherein the top surface, the second outer surface, and the second bottom surface form a second cylindrical lip of the second electrically conductive element.

19. The sensor of claim 17, wherein at least a portion of the proximate portion of the first electrically conductive element and at least a portion of the proximate portion of the second electrically conductive element are located external to the electrically insulative element.

20. The sensor of claim 1, wherein the first electrically conductive element has a first proximate portion and a first distal portion, and wherein the second electrically conductive element has a second proximate portion and a second distal portion, the tilt sensor being further defined by:
the first distal portion further comprising a first cylindrical gap;
the second distal portion further comprising a second cylindrical gap;
the first electrically conductive portion further comprising a first top lip portion; and
the second electrically conductive portion further comprising a second top lip portion, wherein the first top lip portion and the second top lip portion fit over a portion of a top surface of the electrically insulative element.

21. The tilt sensor of claim 20, wherein:

the at least one surface of the first electrically conductive element is a surface that defines the first cylindrical gap;

the at least one surface of the electrically insulative element is a bottom surface of the electrically insulative element; and the at least one surface of the second electrically conductive element is a surface that defines the second cylindrical gap.

22. A method of constructing a sensor having a first electrically conductive element, a second electrically conductive element, an electrically insulative element, and a plurality of conductive weights, the method comprising the steps of:

fitting at least a distal portion of the first electrically conductive element within a hollow center of the electrically insulative member;

positioning the plurality of electrically conductive weights within the hollow center of the electrically insulative member; and fitting at least a distal portion of the second electrically conductive element within the hollow center of the electrically insulative member.

23. The method of claim 22, further comprising the step of fabricating a first nub on a proximate portion of the first conductive element and fabricating a second nub on a proximate portion of the second conductive element.

24. The method of claim 22, wherein the method of constructing the sensor is performed in an inert gas.

25. The method of claim 22, further comprising the steps of:

sealing the first electrically conductive element to the electrically insulative element; and sealing the second electrically conductive element to the electrically insulative element.

* * * * *

(12) EX PARTE REEXAMINATION CERTIFICATE (10361st)
United States Patent
Kelley, Jr. et al.

(10) Number: US 7,326,867 C1
(45) Certificate Issued: *Oct. 24, 2014

(54) OMNIDIRECTIONAL TILT AND VIBRATION SENSOR

(75) Inventors: Whitmore B. Kelley, Jr., Enfield, NH (US); Brian Blades, Concord, NH (US)

(73) Assignee: SignalQuest, Inc., Lebanon, NH (US)

Reexamination Request:
No. 90/012,874, Jun. 28, 2013

Reexamination Certificate for:
Patent No.: 7,326,867
Issued: Feb. 5, 2008
Appl. No.: 11/336,309
Filed: Jan. 20, 2006

( * ) Notice: This patent is subject to a terminal disclaimer.

Related U.S. Application Data

(63) Continuation-in-part of application No. 11/037,497, filed on Jan. 18, 2005, now Pat. No. 7,067,748.

(51) Int. Cl.
*H01H 35/02* (2006.01)

(52) U.S. Cl.
USPC .......................... 200/61.45 R; 200/61.45 M

(58) Field of Classification Search
None
See application file for complete search history.

(56) References Cited

To view the complete listing of prior art documents cited during the proceeding for Reexamination Control Number 90/012,874, please refer to the USPTO's public Patent Application Information Retrieval (PAIR) system under the Display References tab.

*Primary Examiner* — Kenneth J Whittington

(57) ABSTRACT

An omni-directional tilt and vibration sensor contains a first electrically conductive element, a second electrically conductive element, and an electrically insulative element. The electrically insulative element is connected to the first electrically conductive element and the second electrically conductive element, where at least a portion of the first electrically conductive element and at least a portion of the second electrically conductive element are located within the electrically insulative element. A plurality of electrically conductive weights are located within a cavity of the sensor, wherein the cavity is defined by at least one surface of the first electrically conductive element, at least one surface of the electrically insulative element, and at least one surface of the second electrically conductive element.

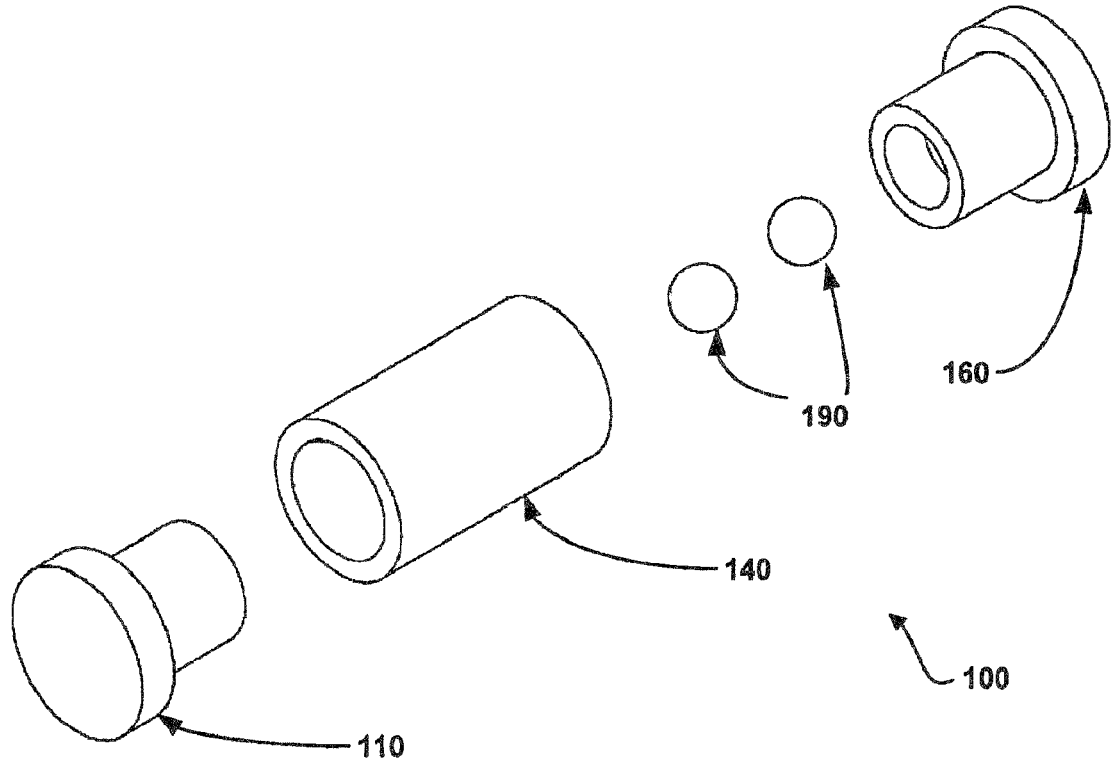

US 7,326,867 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-11, 13-16, 22, 23 and 25 are cancelled.

New claims 26-49 are added and determined to be patentable.

Claims 12, 17-21 and 24 were not reexamined.

26. *A sensor, comprising:*
*a first electrically conductive element having a first diameter on a proximate portion of the first electrically conductive element and a second diameter on a distal portion of the first electrically conductive element, where the second diameter is smaller than the first diameter;*
*a second electrically conductive element having a first diameter on a proximate portion of the second electrically conductive element and a second diameter on a distal portion of the second electrically conductive element, where the second diameter is smaller than the first diameter;*
*an electrically insulative element connected to the first electrically conductive element and the second electrically conductive element; and*
*a plurality of electrically conductive weights located within a cavity of the sensor, wherein the cavity is defined by at least one surface of the first electrically conductive element, at least one surface of the electrically insulative element, and at least one surface of the second electrically conductive element,*
*wherein the distal portion of the first electrically conductive element is inside the electrically insulative element and the proximate portion of the first electrically conductive element is outside the electrically insulative element, and*
*wherein the distal portion of the second electrically conductive element is inside the electrically insulative element and the proximate portion of the second electrically conductive element is outside the electrically insulative element.*

27. *The sensor of claim 26, wherein the sensor is in a closed state (ON) if a conductive path exists from the first electrically conductive element, through a first of the plurality of electrically conductive weights, through a second of the plurality of electrically conductive weights, to the second electrically conductive element, and*
*wherein the sensor is in an open state (OFF) if there is no conductive path from the first electrically conductive element, through the first of the plurality of electrically conductive weights, through the second of the plurality of electrically conductive weights, to the second electrically conductive element.*

28. *The sensor of claim 26, wherein the first electrically conductive element is sealed to the electrically insulative element and the second electrically conductive element is sealed to the electrically insulative element.*

29. *The sensor of claim 26, wherein the first electrically conductive element further comprises a flat end surface located on a side opposite the distal portion of the first electrically conductive element, and wherein the second electrically conductive element further comprises a flat end surface located on a side opposite the distal portion of the second electrically conductive element.*

30. *The sensor of claim 29, wherein the flat end surface of the first electrically conductive element contains a first nub for providing electrical contact of the first electrically conductive element to a first terminal, and wherein the flat end surface of the second electrically conductive element contains a second nub for providing electrical contact of the second electrically conductive element to a second terminal.*

31. *The sensor of claim 26, wherein the distal portion of the first electrically conductive element further comprises:*
*a first top surface;*
*a first outer surface; and*
*a first bottom surface,*
*wherein the first top surface, the first outer surface, and the first bottom surface form a first cylindrical lip of the first electrically conductive element, and*
*wherein the distal portion of the second electrically conductive element further comprises:*
*a second top surface;*
*a second outer surface; and*
*a second bottom surface,*
*wherein the second top surface, the second outer surface, and the second bottom surface form a second cylindrical lip of the second electrically conductive element.*

32. *The sensor of claim 26, wherein a diameter of the distal portion of the first electrically conductive element and a diameter of the distal portion of the second electrically conductive element are smaller than a diameter of the electrically insulative element.*

33. *The sensor of claim 26, further defined by:*
*the proximate portion of the first electrically conductive element further comprising a top surface and an end surface; and*
*the proximate portion of the second electrically conductive element further comprising a top surface and an end surface,*
*wherein the top surface of the first electrically conductive element and the top surface of the second electrically conductive element are located external to the electrically insulative element.*

34. *The sensor of claim 26, wherein the first electrically conductive element and the second electrically conductive element are equal in dimension.*

35. *The sensor of claim 26, wherein the electrically insulative element is fabricated from a material selected from the group consisting of plastic and glass.*

36. *The sensor of claim 26, wherein the electrically insulative element is tube-like in shape.*

37. *The sensor of claim 26, wherein the multiple electrically conductive weights located within the cavity of the sensor include two, and only two, electrically conductive weights.*

38. *The sensor of claim 37, wherein the two, and only two, electrically conductive weights are substantially the same size.*

39. *The sensor of claim 26, wherein a top surface of the distal portion of the first electrically conductive element and a top surface of the proximate portion of the first electrically* conductive element are connected to each other by only a single internal surface that is substantially perpendicular to both the top surface of the distal portion of the first electrically conductive element and the top surface of the proximate portion of the first electrically conductive element, and wherein a top surface of the distal portion of the second electrically conductive element and a top surface of the proximate portion of the second electrically conductive element are connected to each other by only a single internal surface that is substantially perpendicular to both the top surface of the distal portion of the second electrically conductive element and the top surface of the proximate portion of the second electrically conductive element.

40. The sensor of claim 39, wherein the top surface of the proximate portion of the first electrically conductive element and the single internal surface of the first electrically conductive element, in cross-section, form a step from the top surface of the distal portion of the first electrically conductive element, and wherein the top surface of the proximate portion of the second electrically conductive element and the single internal surface of the second electrically conductive element, in cross-section, form a step from the top surface of the distal portion of the second electrically conductive element.

41. The sensor of claim 40, wherein the electrically insulative element is between the internal surface of the first electrically conductive element and the internal surface of the second electrically conductive element.

42. The sensor of claim 41, wherein the electrically insulative element has a proximate surface and a distal surface, wherein the proximate surface and the distal surface are substantially parallel to each other and at axially opposite ends of the electrically insulative element, wherein the proximate surface of the electrically insulative element faces a first one of the internal surface of the first electrically conductive element or the internal surface of the second electrically conductive element, and wherein the distal surface of the electrically insulative element faces a second one of the internal surface of the first electrically conductive element or the internal surface of the second electrically conductive element.

43. The sensor of claim 26, wherein the first electrically conductive element is substantially identical in size and shape to the second electrically conductive element.

44. The sensor of claim 26 configured such that, when motionless, the plurality of electrically conductive weights provide an electrically conductive path between the first electrically conductive element and the second electrically conductive element regardless of the sensor's physical orientation.

45. The sensor of claim 26, wherein the proximate portion of the first electrically conductive element is in the shape of a disk, and wherein the proximate portion of the second electrically conductive element is in the shape of a disk.

46. A method of constructing a sensor having a first electrically conductive element, a second electrically conductive element, an electrically insulative element, and a plurality of conductive weights, the method comprising the steps of:

fitting a distal portion of the first electrically conductive element within a hollow center of the electrically insulative member, wherein a proximate portion of the first electrically conductive element remains external to the hollow center of the electrically insulative member;

positioning the plurality of electrically conductive weights within the hollow center of the electrically insulative member; and fitting a distal portion of the second electrically conductive element within the hollow center of the electrically insulative member, wherein a proximate portion of the second electrically conductive element remains external to the hollow center of the electrically insulative member, wherein a proximate portion of the first electrically conductive element has a first diameter and wherein a distal portion of the first electrically conductive element has a second diameter, and wherein the second diameter is smaller than the first diameter;

wherein a proximate portion of the second electrically conductive element has a first diameter and wherein a distal portion of the second electrically conductive element has a second diameter, and wherein the second diameter is smaller than the first diameter, and wherein the distal portions of the first and second electrically conductive elements are positioned such that none of the electrically conductive weights is capable of falling into a gap formed between the distal portion of the first electrically conductive element and the distal portion of the second electrically conductive element.

47. The method of claim 46, further comprising the step of fabricating a first nub on a proximate portion of the first conductive element and fabricating a second nub on a proximate portion of the second conductive element.

48. The method of claim 46, further comprising the steps of:

sealing the first electrically conductive element to the electrically insulative element; and sealing the second electrically conductive element to the electrically insulative element.

49. A sensor, comprising:

a first electrically conductive element;

a second electrically conductive element;

an electrically insulative element connected to the first electrically conductive element and the second electrically conductive element, where at least a portion of the first electrically conductive element and at least a portion of the second electrically conductive element are located within the electrically insulative element; and a plurality of electrically conductive weights located within a cavity of the sensor, wherein the cavity is defined by at least one surface of the first electrically conductive element, at least one surface of the electrically insulative element, and at least one surface of the second electrically conductive element, wherein:

the first electrically conductive element further comprises a first diameter on a proximate portion of the first electrically conductive element and a second diameter on a distal portion of the first electrically conductive element, where the second diameter is smaller than the first diameter;

the second electrically conductive element further comprises a first diameter on a proximate portion of the second electrically conductive element and a second diameter on a distal portion of the second electrically conductive element, where the second diameter is smaller than the first diameter; and the electrically insulative element is further defined as having a proximate end and a distal end, where at least the distal portion of the first electrically conductive element fits within a proximate end of the electrically insulative element, and where at least the

*distal portion of the second electrically conductive element fits within a distal end of the electrically insulative element, and*

*wherein at least a portion of the proximate portion of the first electrically conductive element and at least a portion of the proximate portion of the second electrically conductive element are located external to the electrically insulative element.*

\* \* \* \* \*